United States Patent Office 3,543,060
Patented Nov. 24, 1970

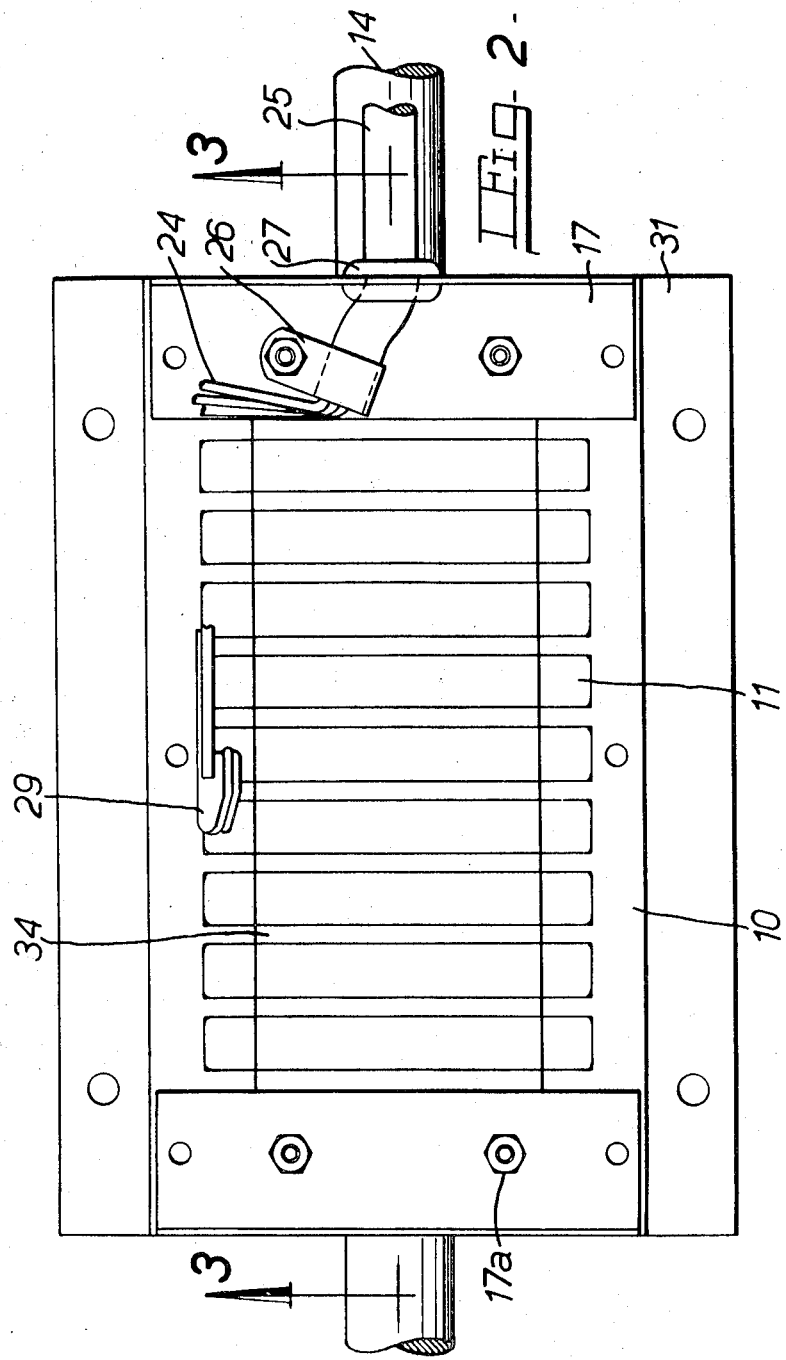

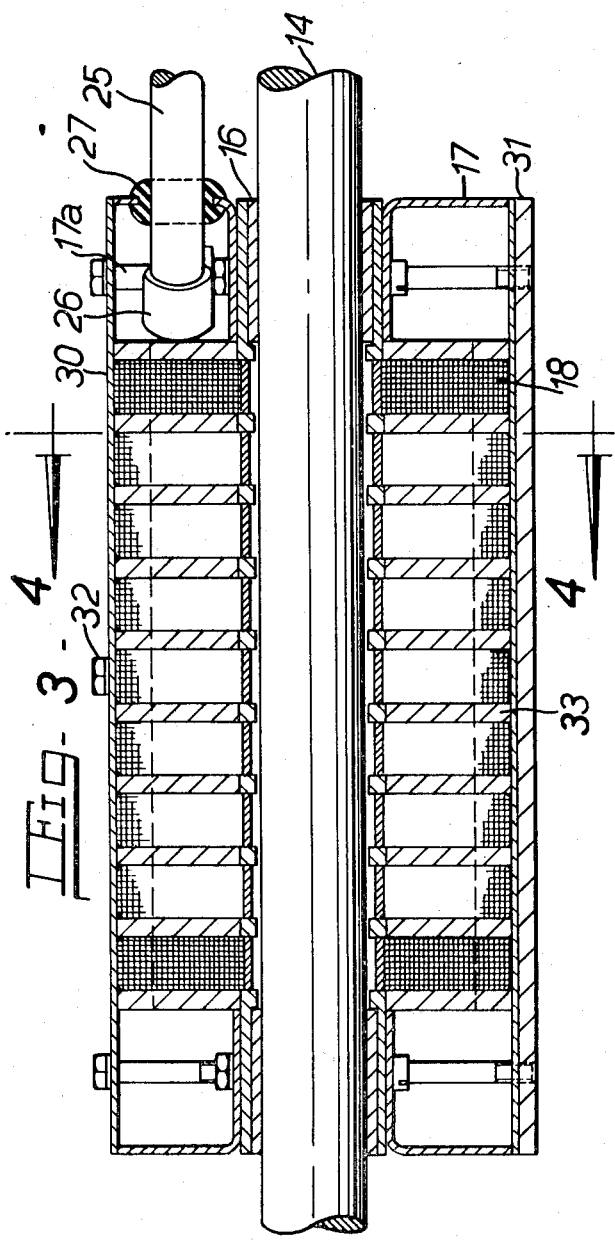

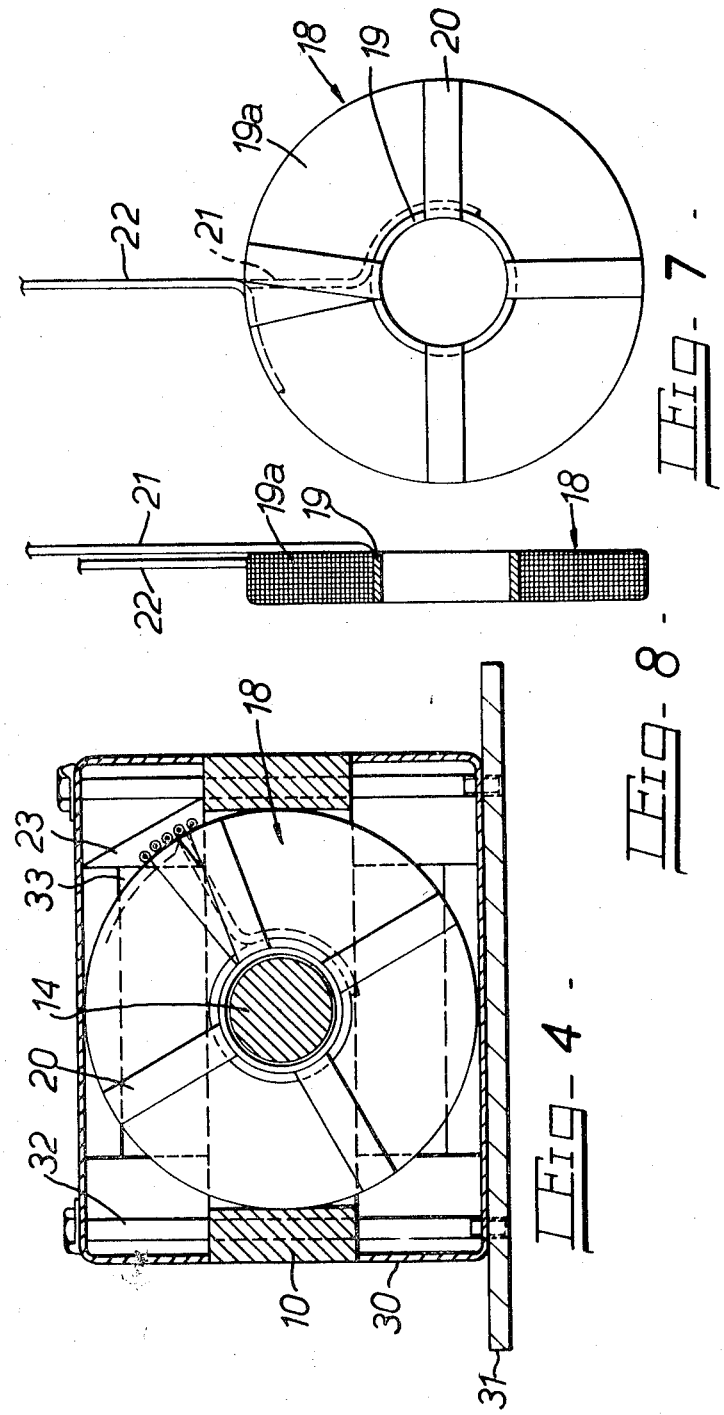

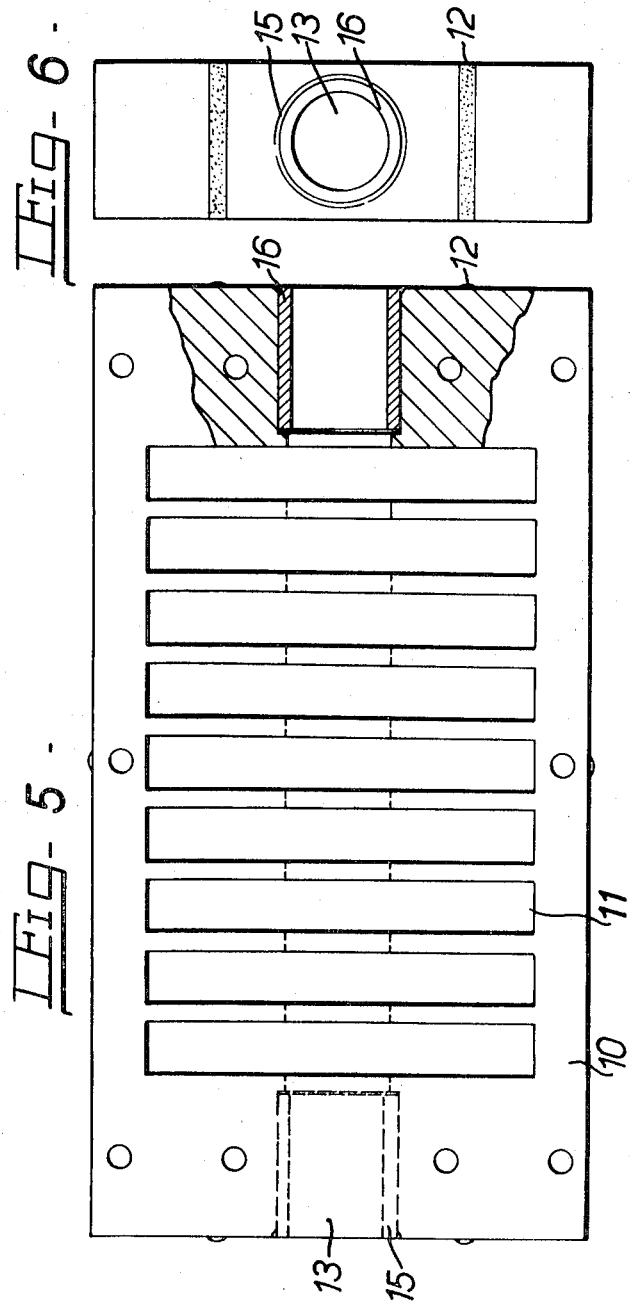

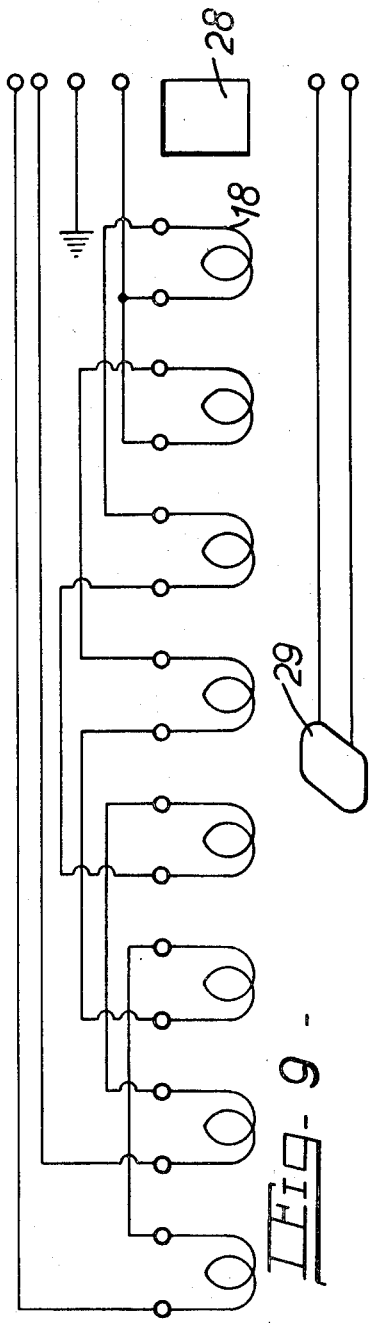

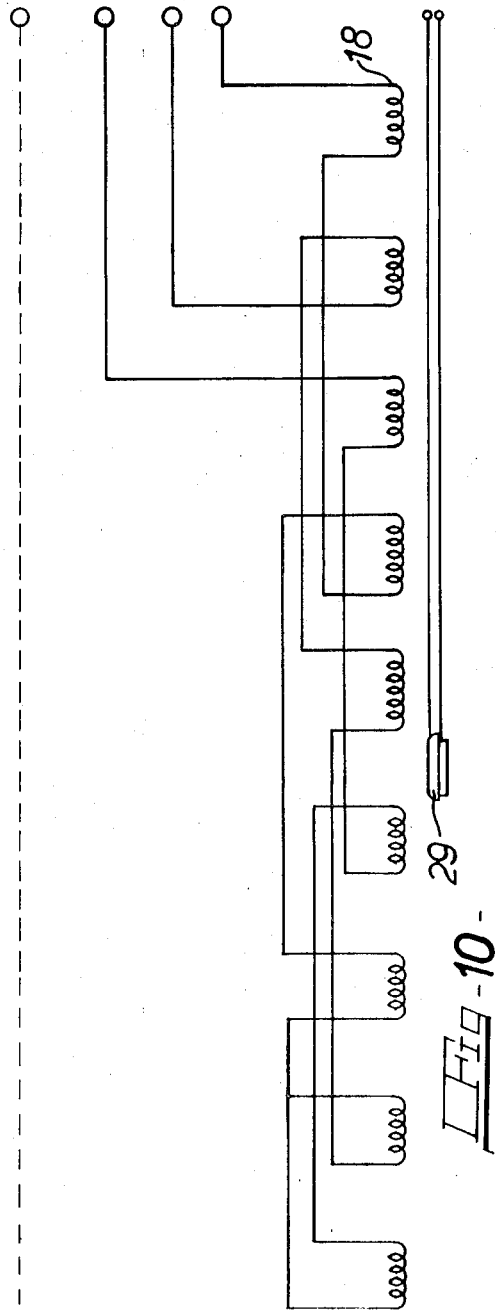

3,543,060
LINEAR INDUCTION MOTORS
James Stephen Holmes, Warwickshire, Noel Howard Kenneth Newman, Middlesex, and Thomas John Taylor, Surrey, England, assignors to Rotax Limited, London, England, a British company
Filed Nov. 25, 1968, Ser. No. 778,498
Claims priority, application Great Britain, Nov. 23, 1967, 53,394/67
Int. Cl. H02k 41/02
U.S. Cl. 310—13            5 Claims

ABSTRACT OF THE DISCLOSURE

A linear motor has a shaft which is axially movable through a stator incorporating a series of axially spaced coils energised by alternating current. The stator is formed by a stack of magnetic laminations whose planes are parallel to the axis of the shaft and the stack has a series of transverse windows which house the coils.

---

Figure 1:
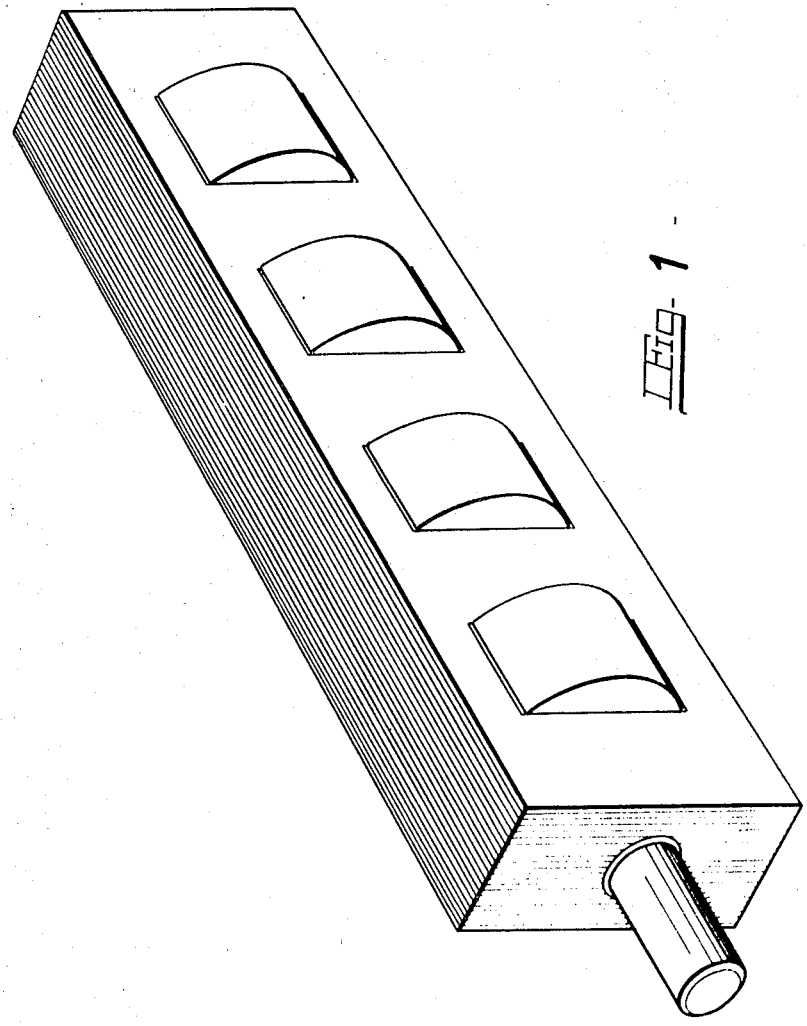

This invention relates to improvements in linear induction motors of the kind in which the moving member is a rod or shaft which is axially movable through a stator incorporating a series of axially spaced coils energised by alternating current. The coils are connected in such a manner that the magnetic field produced travels along the axis of the motor, inducing currents in the shaft so that the resultant forces move the shaft axially.

It is known to separate the coils with apertured stator plates, the plane of the plates and the coils being at right angles to the axis of the motor. The main improvement of the invention lies in separating the coils by stator plates whose plane is parallel to the axis of the motor. By using a stack of plates or laminations, the volume of magnetic core material is increased while the formation of circular eddy currents is hampered.

According to our invention the stator of a linear motor of the kind set forth comprises an assembly of elongated laminations through which a longitudinal bore extends in a direction parallel to the laminations and in which are formed a series of spaced transverse openings housing annular coils of pancake type surrounding the axial bore.

One embodiment of the invention is described by way of example with reference to the accompanying drawings:

FIG. 1 is a diagrammatic representation of a linear motor according to the invention;
FIG. 2 is a view of another linear motor;
FIG. 3 is a cross-sectional view taken along the line 3—3 of FIG. 2;
FIG. 4 is a cross-sectional view taken along the line 4—4 of FIG. 3;
FIG. 5 is a view of the laminated stack and shaft bearing assembly;
FIG. 6 is an end view of FIG. 5;
FIG. 7 is a view of one of the coils;
FIG. 8 is an end view of FIG. 7;
FIG. 9 is a wiring diagram of the linear motor connected for single phase operation; and
FIG. 10 is a wiring diagram of the linear motor connected for three-phase operation.

FIG. 1 of the drawings is a diagram of a four coil linear motor. It is intended to illustrate how a stack of longitudinal laminations supports the field coils in windows through the stack. The remainder of the drawings show a nine coil linear motor in detail.

FIGS. 5 and 6 show the stator as a stack 10 of identical laminations extending the length of the motor and having nine equally spaced rectangular openings or windows 11 through the broader sides. Each lamination is of magnetic material such as 18 SWG mild steel and the stack of laminations can be clamped together by bolts or welded together as at 12.

When the laminations are secured together, a longitudinal bore 13 for the shaft 14 is bored through the stack 10. Alternatively the individual laminations may be of such an outline that when they are assembled together in the correct order a longitudinal bore is formed. The ends of the bore are counterbored at 15 to house bearings 16 in which the shaft 14 is slidably guided. The bearings may be formed of P.T.F.E. or any other material having a low coefficient of friction. The bearings are a press fit in the counterbore 15 and are given additional support by brackets 17 secured to the ends of the stack by bolts 17a.

The shaft 14 is a steel rod normally of circular cross-section though it can be of polygonal cross-section. The shaft 14 is longer than the stack and its projecting ends are threaded or otherwise adapted for connection to a load device (not shown). The outer surface of the shaft is made conductive by copper plating and finishing with hard chrome. Alternatively the shaft may be sprayed with copper or aluminum or it may be enclosed in a thin, closely fitting sheath of copper, aluminum or other conductive metal. Instead of a rigid rod a stranded steel rope or cable with a conducting surface may be used, which can be moved through any desired length.

A typical field coil 18 is illustrated in FIGS. 4, 7 and 8. The coil is wound on a bobbin 19 of insulating material and the winding 19a is held in place by insulating tape 20. The coils 18 are slotted into the openings 11 of the stack and project above and below the stack as shown in FIGS. 1 and 4. The start and finish leads 21, 22 of each coil are brought through a strip of insulating material 23 which runs the length of the stack. The desired connections between coils and the main power leads 24 are made behind the strip 23. The leads 24 are taken from the motor via a cable 25 which is supported by a cable bracket 26 and a grommet 27 fixed in the bracket 17.

A schematic wiring diagram for single phase operation is given in FIG. 9 and for three phase operation in FIG. 10. The direction of the magnetic field can be reversed by incorporating a suitable swtich. Since nine coils cannot be wired for single phase operation, one of the windows 28 in the stack has to be left vacant. In order to control the temperature of the stack a thermostat 29 is fitted between the fourth and fifth coil. Should the motor overheat the thermostat will interrupt the power supply.

The laminated stack and coils are enclosed by two cover plates 30 which are secured to a base plate 31 by six bolts 32 passing at right angles through the stack 10. The cover plates serve to locate and retain the coils. Alternatively, the coils may be secured against movement by any other convenient means and the parts of the coils, which project from the stack may be enclosed by plastics or other covers.

In order to increase the magnetic permeability of the stator or laminated stack 10, rectangular pole plates 33 of magnetic material can be located between the parts of the coils projecting from the laminations. These are held in position by a strip of adhesive tape 34.

It will be appreciated that a motor incorporating more or less than nine coils can be constructed along similar lines. The laminations may extend for the full length of the motor or they may be of relatively short length so that any desired number of such short lengths, each housing one or more coils, can be assembled together to form a motor of whatever length is required to perform the function for which it is designed. In that case, the ends of the units may be formed with spigots or other keying means to locate them in accurate axial alignment.

We claim:

1. A linear induction motor including a shaft, a stator having a longitudinal bore through which said shaft is axially movable and a plurality of spaced annular coils housed in the stator and surrounding said bore, said stator comprising an assembly of elongated laminations, said bore extending through the laminated assembly in a direction parallel to the laminations, a plurality of open ended passageways extending transversely entirely through the laminated assembly, said passageways being defined by longitudinally spaced, registering apertures through said laminations, all of said apertures being entirely within the peripheral edges of the respective laminations so that the passageways throughout their length are entirely bounded by the edges of said apertures, said passageways receiving and locating said annular coils in their position of use within said stator, said passageways being of a size to enable said coils to be introduced into said laminated assembly from the exterior thereof through the open ends of said passageways.

2. The linear induction motor of claim 1 wherein the laminated assembly at the ends of the longitudinal bore is counter-bored to house bearings in which said shaft is slidably guided.

3. The linear induction motor of claim 1 wherein the length of a passageway in the transverse direction through said laminated assembly is less than the diameter of a coil received in said passageway so that a portion of the coil projects through an open end of said passageway beyond the exterior of the stator.

4. A linear induction motor as in claim 1 wherein a portion of each annular coil projects beyond the exterior of the stator and pole plates of magnetic material are located between the projecting portions of the coils.

5. A linear induction motor as in claim 1 wherein said assembly of elongated laminations comprises more than one shorter assembly of laminations each housing at least one annular coil.

References Cited

UNITED STATES PATENTS

| | | | |
|---|---|---|---|
| 2,731,212 | 1/1956 | Baker. | |
| 2,993,130 | 7/1961 | Laithwaite | 310—13 |
| 3,135,879 | 6/1964 | Baumann | 310—13 |
| 3,148,292 | 9/1964 | Bergslien et al. | 310—13 |
| 3,155,851 | 11/1964 | Francis | 310—13 |
| 3,376,441 | 4/1968 | Martin et al. | 310—13 |
| 2,003,647 | 6/1935 | Dillström | 310—14 X |

FOREIGN PATENTS

| | | |
|---|---|---|
| 230,778 | 4/1959 | Australia. |
| 933,920 | | Great Britain. |

DONOVAN F. DUGGAN, Primary Examiner